US011024457B2

(12) United States Patent
Pradhan et al.

(10) Patent No.: US 11,024,457 B2
(45) Date of Patent: Jun. 1, 2021

(54) STATIC ELECTRIC INDUCTION APPARATUS COMPRISING A WINDING AND A SENSOR SYSTEM FOR MONITORING THE TEMPERATURE IN THE WINDING

(71) Applicant: ABB Power Grids Switzerland AG, Baden (CH)

(72) Inventors: Manoj Pradhan, Bålsta (SE); Tor Laneryd, Enköping (SE)

(73) Assignee: ABB POWER GRIDS SWITZERLAND AG, Baden (CH)

(*) Notice: Subject to any disclaimer, the term of this patent is extended or adjusted under 35 U.S.C. 154(b) by 0 days.

(21) Appl. No.: 16/499,036

(22) PCT Filed: Mar. 21, 2018

(86) PCT No.: PCT/EP2018/057190
§ 371 (c)(1),
(2) Date: Sep. 27, 2019

(87) PCT Pub. No.: WO2018/184850
PCT Pub. Date: Oct. 11, 2018

(65) Prior Publication Data
US 2020/0381175 A1 Dec. 3, 2020

(30) Foreign Application Priority Data
Apr. 5, 2017 (EP) .................... 17164935

(51) Int. Cl.
*H01F 27/28* (2006.01)
*H01F 27/40* (2006.01)
(Continued)

(52) U.S. Cl.
CPC ....... *H01F 27/402* (2013.01); *G01K 11/3206* (2013.01); *H01F 27/28* (2013.01); *G01K 11/324* (2021.01); *H01F 2027/406* (2013.01)

(58) Field of Classification Search
CPC .. H01F 27/402; H01F 27/28; H01F 2027/406; G01K 11/3206; G01K 2011/324
See application file for complete search history.

(56) References Cited

U.S. PATENT DOCUMENTS 3,960,017 A  6/1976 Romanowski
5,455,551 A * 10/1995 Grimes ................. H01F 27/322
                                               250/227.14
(Continued)

FOREIGN PATENT DOCUMENTS

CN  105529162 A   4/2016
EP    2806436 A1  11/2014
(Continued)

OTHER PUBLICATIONS

International Preliminary Report on Patentability Application No. PCT/EP2018/057190 Completed: Jul. 16, 2019; dated Jul. 16, 2019 12 pages.
(Continued)

*Primary Examiner* — Tuyen T Nguyen
(74) *Attorney, Agent, or Firm* — Sage Patent Group

(57) ABSTRACT

The present invention relates to a static electric induction apparatus (1b) comprising a winding (2) including a plurality of winding units (3), at least one first spacer element (5) arranged between the winding units (3) and including a first groove (18) defined in the surface thereof, and a sensor system for monitoring the temperature in the apparatus, wherein the sensor system comprises an elongated and flexible temperature sensing element (16) disposed in the first groove. The first groove (18) has a curved part that receives the flexible temperature sensing element which is wound at least one revolution in the first groove (18). The first groove enters and exits the first spacer element in one and the same end of the first spacer element. The apparatus comprises an elongated second spacer element (14a) extend-
(Continued)

ing in an axial direction on the outside of the winding (2). The second spacer element (14a) comprises an elongated second groove (22) arranged in communication with the first groove, and the flexible temperature sensing element (16) is disposed in the first and second grooves.

19 Claims, 5 Drawing Sheets

(51) Int. Cl.
*G01K 11/3206* (2021.01)
*G01K 11/324* (2021.01)

(56) References Cited

U.S. PATENT DOCUMENTS

| | | | |
|---|---|---|---|
| 5,651,175 A | | 7/1997 | Grimes et al. |
| 9,484,146 B2 * | | 11/2016 | Hinz ................ H01F 29/00 |
| 9,541,458 B2 | | 1/2017 | Adolf et al. |
| 2012/0247229 A1 | | 10/2012 | Woodcock |
| 2014/0034286 A1 * | | 2/2014 | Sarver ................ H01F 41/00 165/287 |

FOREIGN PATENT DOCUMENTS

| | | |
|---|---|---|
| EP | 2851912 A1 | 3/2015 |
| JP | H06300636 A | 10/1994 |
| JP | H09178799 A | 7/1997 |
| JP | 2011-203066 A | 10/2011 |

OTHER PUBLICATIONS

International Search Report and Written Opinion of the International Searching Authority Application No. PCT/EP2018/057190 Completed: Jun. 20, 2018; dated Jul. 2, 2018 11 pages.
Canadian Office Action Application No. 3,057,900 Completed: Nov. 8, 2019 3 Pages.
First Office Action, Indian Patent Application No. 201947039163, dated Aug. 28, 2020, 5 pages.

* cited by examiner

STATIC ELECTRIC INDUCTION APPARATUS COMPRISING A WINDING AND A SENSOR SYSTEM FOR MONITORING THE TEMPERATURE IN THE WINDING

FIELD OF THE INVENTION

The invention relates to a static electric induction apparatus comprising a winding, and a sensor system for monitoring the temperature in the winding. More specifically, the invention relates to a high voltage transformer including a winding and a sensor system for monitoring the temperature in the winding.

BACKGROUND OF THE INVENTION

Known static electric induction apparatus, such as transformers and shunt reactors, comprise a tank that contains an active part including a core, and one or more current carrying windings wound a plurality of turns around the core. FIG. 1 shows an example of a prior electric induction apparatus 1a including a winding 2 in a perspective view, and in a cross-section A-A. The winding 2 may include a plurality of winding units 3 shaped as discs, which are arranged on top of each other. Each of the winding units 3 comprises one or more turns of a conductor cable. The electric winding may also be helically shaped. When the induction apparatus is in use, the winding generates heat, which needs to be dissipated by a cooling fluid, such as oil or ester based liquids. The heat decreases the life expectancy of the induction apparatus and it is therefore generally required to cool the induction apparatus by using an efficient and robust cooling system. The winding units 3 are usually spaced apart in the vertical direction by horizontal spacer elements 5 to form horizontal fluid ducts 7 for the cooling liquid in between two winding units or in between two turns of the helical winding. The winding is often cylindrical. The insulation system surrounding the winding often includes an outer insulating cylinder 4a and an inner insulating cylinder 4b, and the winding 2 is disposed between the outer and inner insulating cylinders. Vertical fluid ducts are usually formed in between the outer insulating cylinder 4a and the stacked winding units 3 and in between the inner insulating cylinder 4b and the stacked winding units 3. In most cases the vertical fluid ducts are limited or defined in a horizontal or circumferential direction by vertical spacer elements 14, which are used to hold the outer insulating cylinder 4a in position. EP2851912 discloses an example of the above described electric induction apparatus.

Transformers and shunt reactors are important and expensive elements of a power system.

Inordinate localized temperature rise causes rapid thermal degradation of insulation and subsequent thermal breakdown. In order to draw maximum power from the transformer and at the same time to avoid thermal mishaps, it is essential to carefully study its thermal behaviour in all its entity. To prescribe the limits of short term and long-term loading capability of a transformer, it is necessary to measure the hottest spot temperature (HST) of a transformer winding to as high degree of accuracy as can possibly be made.

Conventionally, the HST in a transformer winding is estimated from a very simple model using parameters measured in the heat run test. Due to the advent of finite element based computational software, many details of structural design and fluid flow along the winding are estimated. Despite this development, very accurate calculation of HST magnitude and location to make optimum usage of power transformer is not possible today, e.g. due to modelling assumptions, modelling simplifications, manufacturing tolerances and other discrepancies in production. In order to mitigate the situation, transformers are often de-rated by substantial margin in order to avoid the HST exceeding the limit specified by international standards.

There exists sensor system including fibre optic temperature sensors adapted to measure the temperature at single points in a transformer, which are installed permanently at some critical locations in the transformer. The use of fibre optic sensors at discrete points does not provide reliable assessment of the HST. The location of the sensors between the turns does not enable measurement of the actual HST inside the winding. Further, the actual location of the hottest zone often differs from sensor installation points. In order to measure the HST in the transformer winding with high accuracy, a large number of sensors is needed. However, each sensor requires individual connection cables, which requires a very complex and unpractical manufacturing process. Further, these connection cables block the free passage of cooling fluid and therefore reduce the thermal performance of the transformer.

U.S. Pat. No. 9,484,146 discloses a high voltage transformer having a sensor system for monitoring physical characteristic variables, such as the temperature. The sensor system includes a plurality of sensors, each sensor comprising a glass fibre with a sensor head. The sensor head supports a plurality of Bragg gratings. The sensors are arranged between successive turns of the winding of the high voltage transformer using spacers. An evaluation unit is associated with the sensor system and is connected to the sensor head via the glass fibre. This sensor system has the above-mentioned disadvantage of single point sensors.

It is known to use distributed fibre optic temperature sensors into traction transformers. Distributed temperature sensing systems (DTS) measure temperatures by means of optical sensor cables including optical fibres functioning as linear sensors. The temperatures are recorded along the length of the optical sensor cable. A high accuracy of temperature determination is achieved over large distances. One type of distributed temperature sensor is the Raman sensors using the so-called Raman scattering principle. A disadvantage with the Raman sensors is their bad resolution. Typically, a DTS system using a Raman sensor can locate the temperature to a spatial resolution of 1 m. Using specialized techniques, researchers are reporting improvements in the spatial resolution of Raman sensors down to 40 cm and even down to 15 cm. Other distributed fibre optic sensors, such as fibre Bragg grating quasi-distributed sensors, Raleigh sensors and Brillouin sensors can measure the temperature with even finer spatial resolution, typically in the order of cm. However, these sensors are much more complex and extremely expensive for transformer application. In particular, the Raleigh and Brillouin scattering is sensitive to mechanical strain as well as temperature, which may cause measurement error if the cable is under strain due to the thermal expansion of the materials. Hence, it is desirable to utilize Raman distributed sensors for measuring the temperature of the winding in the transformers.

U.S. Pat. No. 5,455,551 discloses a transformer including a winding and a sensor system utilizing a Raman distributed sensor for measuring the temperature of the winding in the transformer. The transformer includes a winding having a plurality of winding turns and a plurality of duct spacers arranged between the winding turns in order to keep them separated. The sensor system is adapted for distributed temperature measuring based on the Raman scattering principle. At least one of the duct spacers is provided with a plurality of grooves defined in the surface of the duct spacer. The grooves are spaced apart in the longitudinal direction of the duct spacer and disposed on opposite sides of the spacer. A flexible temperature sensing element in the form of an optical sensor cable is secured within the grooves so that the optical sensor cable does not protrude from the grooves beyond the surface in which the groove is formed. The optical sensor cable is wound a large number of turns around the duct spacer, and the turns are displaced along the longitudinal axis of the duct spacer. A disadvantage with this sensor system is that a large part of the sensor cable is disposed in the oil surrounding the winding, and accordingly is not in contact with the conductor cable of the winding. This can lead to an incorrect measurement since the temperature of the oil may differ from the temperature in the winding. Another disadvantage is that it is complicated and difficult to manufacture the duct spacers including the flexible temperature sensing element.

U.S. Pat. No. 3,960,017 discloses a transformer comprising a plurality of winding units, and spacer elements arranged between the winding units. The spacer elements have grooves defined in the surface thereof. The transformer further comprises a sensor system for monitoring the temperature in the transformer. The sensor system comprises elongated and flexible temperature sensing elements disposed in the grooves. The groove enters and exits the spacer element in one and the same end of the spacer element.

OBJECT AND SUMMARY OF THE INVENTION

It is an object of the present invention to at least partly overcome the above-mentioned problems, and to improve monitoring of the temperature in windings of static electric induction apparatus.

This object is achieved by a static electric induction apparatus as defined in claim 1.

The static electric induction apparatus comprises a winding including a plurality of winding units, at least one first spacer element including a first groove defined in the surface thereof and arranged between the winding units, and a sensor system for monitoring the temperature in the apparatus. The sensor system comprises an elongated and flexible temperature sensing element disposed in the first groove. The first groove has a curved part. The curved part receives the flexible temperature sensing element. The flexible temperature sensing element is wound at least one revolution in the first groove. The first groove enters and exits the first spacer element in one and the same end of the first spacer element. The apparatus comprises an elongated second spacer element extending in an axial direction on the outside of the winding. The second spacer element comprises an elongated second groove arranged in communication with the first groove, and the flexible temperature sensing element is disposed in the first and second grooves.

The winding unit comprises one or more turns of the winding. The first spacer element is in contact with the winding units on opposite sides of the spacer element. The flexible temperature sensing element is disposed in the first groove, and not in the oil between the units. This is advantageous since the spacers will have the same temperature as the winding. The temperature sensing element will measure the temperature of the first spacer element, and accordingly the temperature of the winding units on opposite sides of the spacer element.

A curved groove is created in the first spacer where the elongated temperature sensing element, such as a fibre optic cable, is placed. Thus, the temperature sensing element is protected from accidental damage during the manufacturing process. Fibre optic cables are fragile and can easily be broken if they are bent too much. The curved groove holds the temperature sensing element in place, and ensures that the limitation on the bending radius of the temperature sensing element is upheld. The bending radius of the groove can be adapted to the limitation on the bending radius of the temperature sensing element.

The fact that the first groove enters and exits the first spacer at the same end of the first spacer element facilities the mounting of the temperature sensing element. Further, the combination of the facts that first groove is curved and the first groove enters and exits the first spacer at the same end of the first spacer element, makes it possible to wrap the flexible temperature sensing element one or more revolutions inside the first groove, and by that enables measurement of the temperature by means of the Raman scattering principle.

The apparatus comprises an elongated second spacer element extending in an axial direction on the outside of the winding, the second spacer element comprises an elongated second groove arranged in communication with the first groove, and the temperature sensing element is disposed in the first and second grooves. The first and second spacer elements are elongated. The first spacer element extends in a radial direction, and the second spacer element extends in an axial direction, i.e. the first and second spacer elements are arranged perpendicular to each other. The first and second spacer elements can be in physical contact with each other, or they can be arranged close to each other to enable the temperature sensing element to extend between the first and second spacer elements. A second groove is created on the inside of the second spacer element for the temperature sensing element to be placed. The second groove guides the temperature sensing element in an axial direction to the first spacer. Further, the second spacer protects the temperature sensing element from accidental damage during the manufacturing process.

Further advantages with the invention is that manufacturing of the electric induction apparatus including the temperature sensing element becomes simple, since it is easy to lay down the flexible temperature sensing element in the bent groove. Further, damaging of the temperature sensing element due to over bending of the temperature sensing element is avoided.

The term "winding units" covers turns of a helical winding as well as disc shaped parts of the winding. With the term "the first spacer element is disposed between the winding units" is meant that the first spacer element is disposed between two discs or in between two turns of a helical winding or between turns of a winding having other shapes.

The temperature sensing element is wound at least one revolution in the first groove. By winding the temperature sensing element one or more revolutions, the length of the temperature sensing element, such as a fibre optic cable, in the first groove can be adjusted to correspond to the resolution of the method used for determining the temperature of the winding. The lower resolution of the measuring method, the more revolutions are needed.

The temperature can, for example, be determined using Raman, Brillouin or Raleigh scattering, or Bragg gratings. The resolution for measurement with Brillouin and Raleigh scattering, and for Bragg gratings is higher than the resolution for measurement with Raman scattering. Thus, the length of the temperature sensing element in the groove should be shorter for Brillouin and Raleigh scattering, and Bragg gratings than for Raman scattering due to the higher resolution. The resolution for Brillouin and Raleigh scattering is typically in the order of cm. Thus, one revolution can be enough in this case.

According to an embodiment of the invention, the temperature sensing element is wound a plurality of revolutions in the first groove. For example, the temperature sensing element is wound at least three revolutions in the first groove. This embodiment allows the length of the sensing element to correspond to the resolution of Raman scattering. The resolution of Raman scattering is about 1 m. Thus, more than one revolution and typically more than three revolutions are needed for Raman scattering.

According to an embodiment of the invention, the winding is cylindrical and has an envelope surface, the at least one first spacer element extends radially between the winding units, and has an outer end facing towards the envelope surface of the winding, and the first groove enters and exits the first spacer element at the outer end of the first spacer element. The outer end of the first spacer element faces outwards from the winding. This embodiment makes it possible to mount the flexible temperature sensing element from the outside of the winding, and thus further facilities manufacturing of the electric induction apparatus. Further, the sensors can be tested and replaced until the last stage of the assembly process.

According to an embodiment of the invention, the length of the part of the temperature sensing element, which is wound in the first groove is at least 0.15 m, preferably at least 0.4 m, and most preferably at least 0.1 m. Thus, the length of the sensing element in the first groove corresponds to the resolution of the Raman scattering, and the local temperature can be accurately measured within the limitation on resolution of the Raman scattering.

According to an embodiment of the invention, the first groove is circular or at least partly circular. A circular groove is easy to manufacture and suitable to house one or more revolutions of the sensing element.

According to an embodiment of the invention, the at least one first spacer element comprises a plurality of first spacer elements arranged above each other, wherein each of the first spacer elements has a first groove defined in the surface thereof and arranged in communication with the second groove of the second spacer element, and the temperature sensing element is disposed in the first grooves of the first spacer elements and in the second groove of the second spacer element. The first spacer elements is, for example, mounted at different vertical positions in the axial direction of the winding. This embodiment enables simultaneously measuring of the temperature distribution across the entire winding height with a single distributed temperature sensor.

According to an embodiment of the invention, the sensor system comprises an optic sensor adapted for distributed temperature measuring.

In a preferred embodiment, the optic sensor is a Raman sensor. Raman sensors use the so-called Raman scattering principle, are suitable for distributed temperature measurement in transformers and reactors since they are not sensitive to mechanical strain due to the thermal expansion of the winding. Further, Raman sensors are simple and inexpensive.

According to an embodiment of the invention, the temperature sensing element is a fibre optic cable.

According to an embodiment of the invention, the sensor system comprises an optic sensor configured to generate a laser pulse passing through the fibre optic cable and to detect when the laser pulse is returned, and an evaluating unit configured to determining the temperature in the winding based on based on the light scattering of the laser pulse and the time difference between the points in time when the pulse was generated and when it was returned.

According to an embodiment of the invention, the electric induction apparatus is a transformer, and more particular a high voltage transformer. With high voltage is meant a voltage above 1 kV. The winding can be a disc winding or a helical winding.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
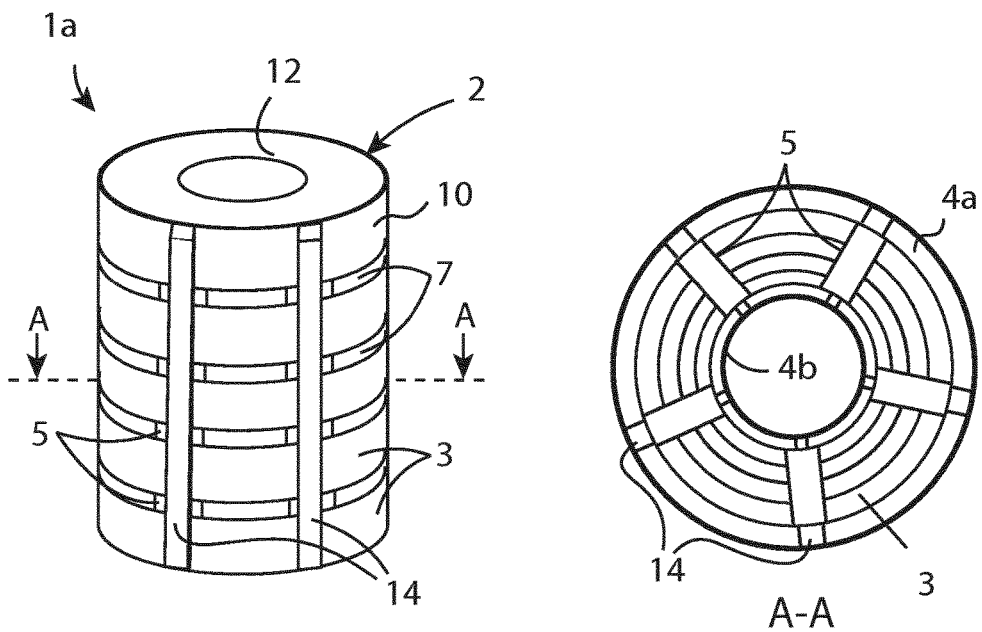
FIG. 1 shows an example of a prior electric induction apparatus in a perspective view, and in a cross-section A-A.

In the various figures, the same and corresponding functional parts are designated by the same reference numerals.

Figure 2:
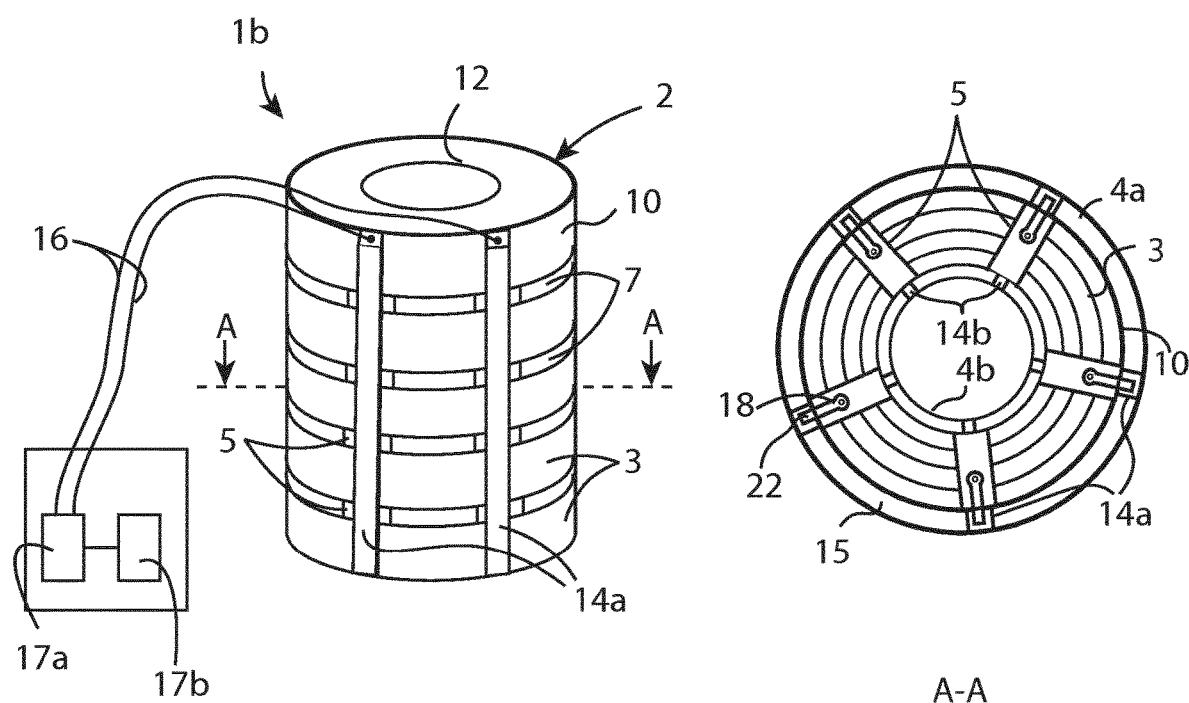
FIG. 2 shows an example of an electric induction apparatus according to an embodiment of the invention in a perspective view, and in a cross-section A-A.

FIG. 2 shows an example of a static electric induction apparatus $1b$ according to an embodiment of the invention. In this example, the static electric induction apparatus $1b$ is a transformer of disc type. However, the invention is not limited to transformers, for example, the invention can also be applied to shunt reactors. The left part of FIG. 2 shows a perspective view of the static electric induction apparatus 1 and the right part of FIG. 2 shows a cross-section A-A through the static electric induction apparatus 1.

The static electric induction apparatus $1b$ comprises a winding 2 including a plurality of winding units 3 stacked on top of each other. In this example the winding is cylindrical. However, in other types of static electric induction apparatus the winding can have other shapes, for example, rectangular. In this example, the winding units 3 are disc shaped. Each of the winding units 3 comprises one or more turns of a conductor cable. The static electric induction apparatus $1b$ may comprise an outer electrical insulating cylinder $4a$ and an inner electrical insulating cylinder $4b$, and the winding 2 can be positioned between the outer and inner cylinders 4a-b. The winding 2 is immersed in a cooling fluid, for example, oil.

The static electric induction apparatus 1b further comprises a plurality of first spacer elements, in the following denoted horizontal spacer elements 5, arranged between the winding units 3 to form a plurality of horizontal fluid ducts 7 between the winding units 3 for housing the cooling fluid. The horizontal fluid ducts 7 are configured to let the cooling fluid pass through them. The winding units 3 are spaced apart by the horizontal spacer elements 5. The horizontal spacer elements 5 are arranged in between two consecutive winding units 3. The horizontal spacer elements 5 extend through the winding 2 in a radial direction from an outer periphery 10 of the winding 2 to an inner periphery 12 of the winding 2. The first spacer elements 5 have an outer end 8 facing outwardly from the winding, i.e. facing the outer periphery 10 of the winding 2, and an inner end 9 facing inwardly towards a central axis of the winding, i.e. facing the inner periphery 12 of the winding 2.

The static electric induction apparatus 1b further comprises a plurality of elongated vertical inner and outer second spacer elements, in the following denoted vertical spacer elements 14a-b, which are configured to hold and position the winding units 3. The inner and outer vertical spacer elements 14a-b define, together with outer and inner electrical insulating cylinders 4a-b a plurality of vertical fluid ducts 15 disposed around the periphery of winding 2. The horizontal spacer elements 5 and the outer and inner vertical spacer elements are aligned in radial directions, as shown in the right part of FIG. 2. Preferably, the outer ends 8 of the horizontal spacer elements 5 and the outer vertical spacer elements 14a are in physical contact with each other. Alternatively, the horizontal spacer elements 5 and the outer vertical spacer elements 14a are disposed closed to each other.

The static electric induction apparatus 1b further comprises a sensor system for monitoring the temperature in the apparatus, wherein the sensor system comprises at least one elongated and flexible temperature sensing element 16, for example, in the form of an optical sensor cable such as a fibre optic cable. In a preferred embodiment, the sensor system is a distributed temperature sensing system (DTS). Temperatures are recorded along the length of the flexible temperature sensing element, thus not at single points. The temperature can, for example, be determined using Raman, Brillouin or Raleigh scattering, or Bragg gratings.

In a preferred embodiment, the flexible temperature sensing element 16 is a fibre optic cable, and the sensor system comprises an optic sensor 17a adapted for distributed temperature measuring, and an evaluating unit 17b configured to determine the temperature in the winding based on the temperature measuring. The optic sensor 17a is, for example, configured to generate a laser pulse passing through the fibre optic cable and to detect when the laser pulse is returned, and the evaluating unit 17b is configured to determining the temperature in the winding based on the light scattering of the laser pulse, and to determine the position of the determined temperature based on the time difference between the points in time when the pulse was generated and when it was returned. For example, the optic sensor 17a is a Raman sensor.

At least one of the horizontal spacer elements 5 is provided with a first groove 18 defined in the surface thereof. According to the invention, the first groove 18 is curved and enters and exits the first spacer element at one end of the horizontal spacer elements 5. The flexible temperature sensing element 16 is disposed in the first groove 18. In a preferred embodiment, all of the horizontal spacer elements 5 are provided with a first groove 18 defined in the surface thereof. It is also possible to provide same of the horizontal spacer elements 5 with the first groove 18. The first groove 18 is designed so that it enters and exits the horizontal spacer element 5 either in the outer end 8 or the inner end 9 of the horizontal spacer element. In a preferred embodiment, the first groove 18 is designed so that it enters and exits the horizontal spacer element 5 in the outer end 8 of the spacer element to facilitate mounting of the flexible temperature sensing element 16.

The first groove 18 is designed so that the flexible temperature sensing element 16 fits in the groove and does not protrude from the first groove in order to protect the flexible temperature sensing element 16 from accidental damage during the manufacturing process. The width and depth of the first groove depends on the diameter of the flexible temperature sensing element 16 and the number of revolutions the flexible temperature sensing element 16 is wound in the first groove. The depth and width of the first groove is preferably equal or larger than the diameter of the flexible temperature sensing element 16. The length of the first groove depends on the resolution of the method used for measuring the temperature in the winding.

Figure 3:
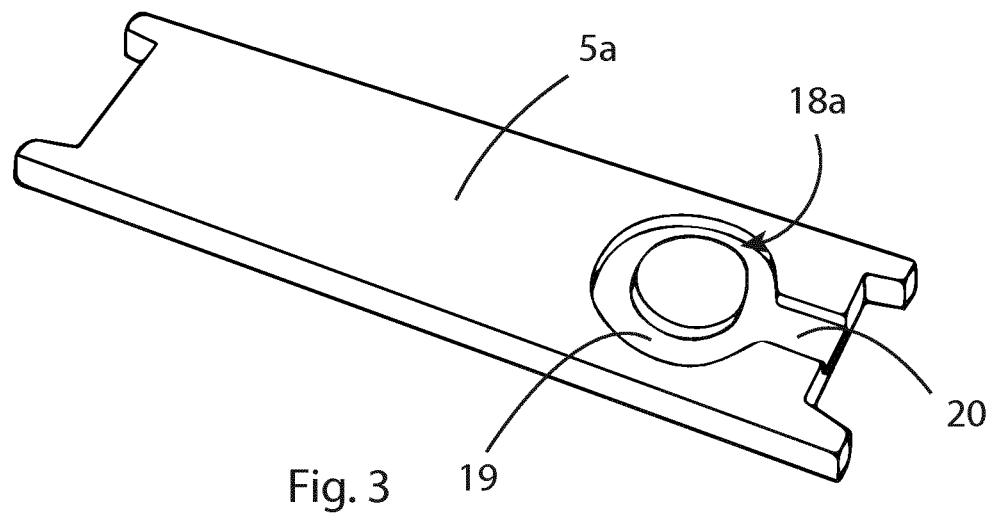
FIG. 3 shows an example of a first spacer element of an electric induction apparatus according to the invention.

The first groove 18 can be designed in many different ways. FIG. 3 shows an example of a horizontal spacer element 5a of an electric induction apparatus according to the invention provided with a first groove 18a. The first groove 18a has a curved part 19 and an entrance/exit part 20 disposed between the end of the horizontal spacer element 5a and the curved part for receiving the flexible temperature sensing element 16. Preferably, the first groove 18a is arranged in an upper surface of the horizontal spacer element facing the winding unit 3 and adapted for being in physical contact with the winding unit 3.

Figure 4:
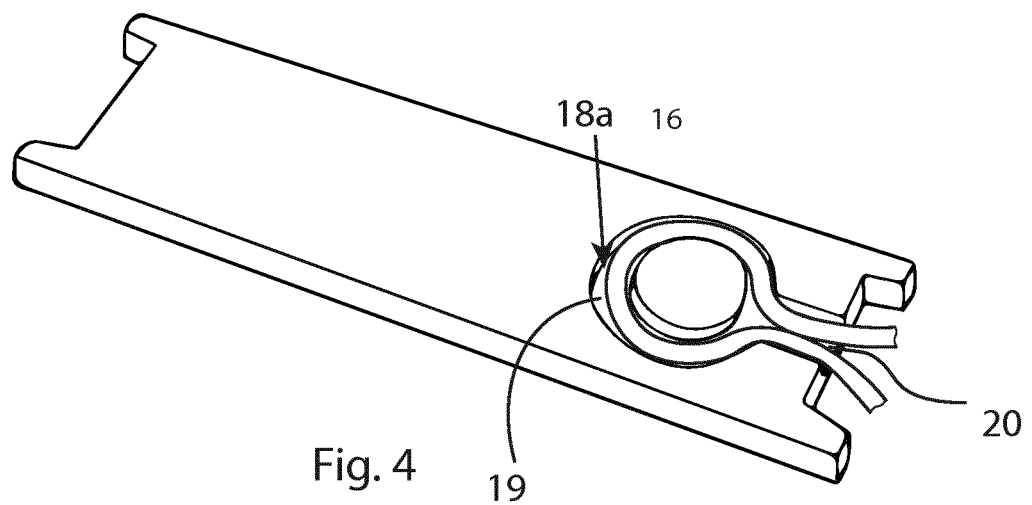
FIG. 4 shows an optical cable disposed in a groove in the first spacer element shown in FIG. 3.

FIG. 4 shows a flexible temperature sensing element 16, in the form of an optical cable, disposed in the first groove 18a in the horizontal spacer element 5a. The temperature sensing element can be wound one or more revolutions in the first groove. In this example, the temperature sensing element is wound one revolution in the first groove 18a. However, in other embodiments of the invention, the temperature sensing element can be wound a plurality of revolutions, typically between two and five revolutions. By winding the temperature sensing element one or more revolutions, the length of the temperature sensing element in the first groove can be adjusted to correspond to the resolution of the method used for determining the temperature of the winding. The lower resolution of the measuring method is, the more revolutions are needed. The resolution for measurement with Brillouin and Raleigh scattering, and for Bragg gratings is higher than the resolution for measurement with Raman scattering. Thus, the length of the temperature sensing element in the groove should be shorter for Brillouin and Raleigh scattering, and Bragg gratings than for Raman scattering due to the higher resolution. The resolution for Brillouin and Raleigh scattering is typically in the order of cm. Thus, one revolution can be enough in this case. However, the spatial resolution of a Raman sensor is larger and typically about 1 m. Thus, the temperature sensing element 16 is preferably wound two or more revolutions in the first groove 18a when a Raman sensor is used. Suitably, the length of the part of the flexible temperature sensing element 16, which is wound in the first groove 18a is about 1 m when a Raman sensor is used. Typically, more than three revolutions are needed if a Raman sensor is used for measuring the temperature.

Figure 5A:
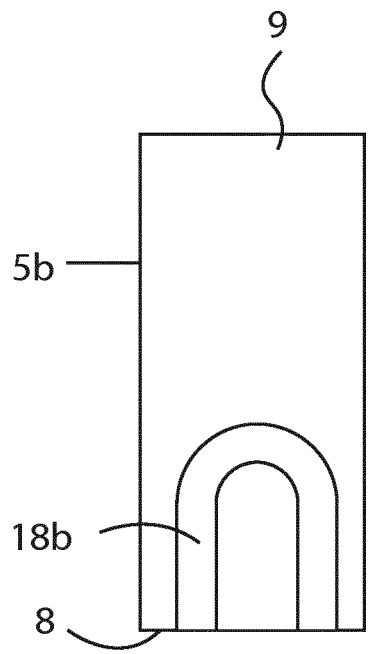
FIGS. 5a-c show other examples of first spacer elements of an electric induction apparatus according to the invention.
Figure 5B:
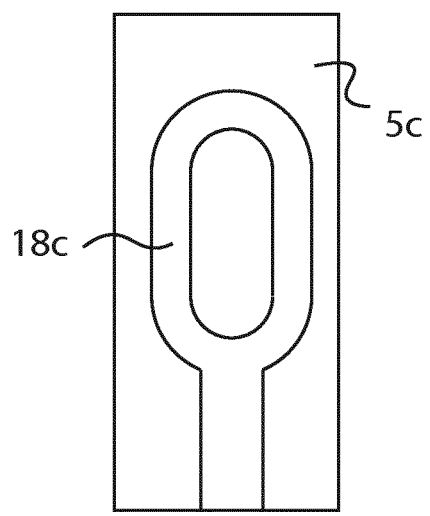
Figure 5C:
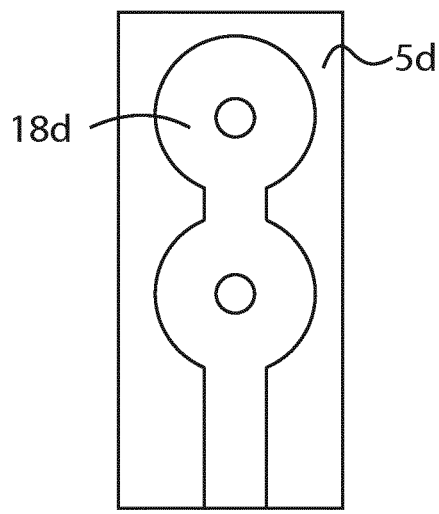

FIGS. 5a-c show other examples of horizontal spacer elements provided with first grooves 18a-c with different shapes. The horizontal spacer elements all have in common that each of the grooves 18a-c has a curved part, and the groove enters and exits the horizontal spacer in one and the same end.

Figure 6:
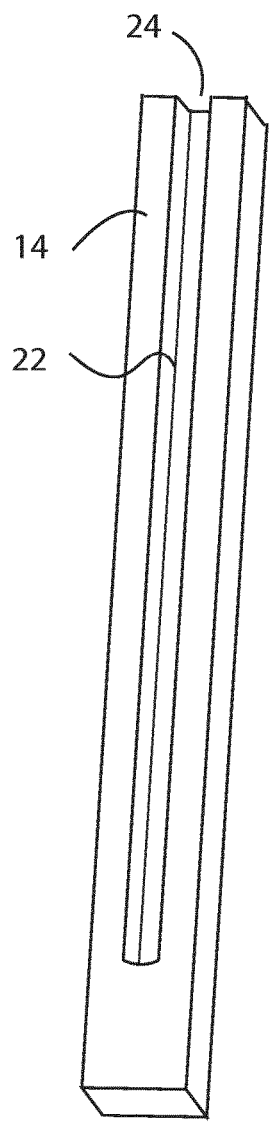
FIG. 6 shows an example of a second spacer element of an electric induction apparatus according to an embodiment of the invention.

FIG. 6 shows an example of a second spacer element 14, in the following denoted a vertical spacer element, of an electric induction apparatus according to an embodiment of the invention. The vertical spacer element 14 can be an outer or inner vertical spacer element 14a-b. In a preferred embodiment, the vertical spacer element 14 is an outer vertical spacer element and extends on the outside of the winding 2 in an axial direction, as shown in FIG. 2. The vertical spacer element 14 is elongated and the longitudinal axis of the vertical spacer element is perpendicular to the longitudinal axis of the horizontal spacer elements 5.

The vertical spacer element 14 comprises an elongated second groove 22 extending along the longitudinal axis of the vertical spacer element 14. The second groove 22 is designed so that the flexible temperature sensing element 16 fits in the groove and does not protrude from the second groove in order to protect the flexible temperature sensing element 16 from accidental damage during the manufacturing process. The width and depth of the second groove depends on the diameter of the flexible temperature sensing element 16. The depth and width of the second groove is preferably equal or larger than the diameter of the flexible temperature sensing element 16. The length of the second groove depends on the length of the vertical spacer element. The second groove may extend along the entire length of the vertical spacer element, or may end a short distance from the end of the vertical spacer element, as shown in FIG. 6. In this embodiment, the second groove 22 has an entrance 24 for the flexible temperature sensing element arranged at one end of the vertical spacer element 14. The entrance 24 for the flexible temperature sensing element can be disposed at an upper or lower end of the vertical spacer element 14.

Figure 7:
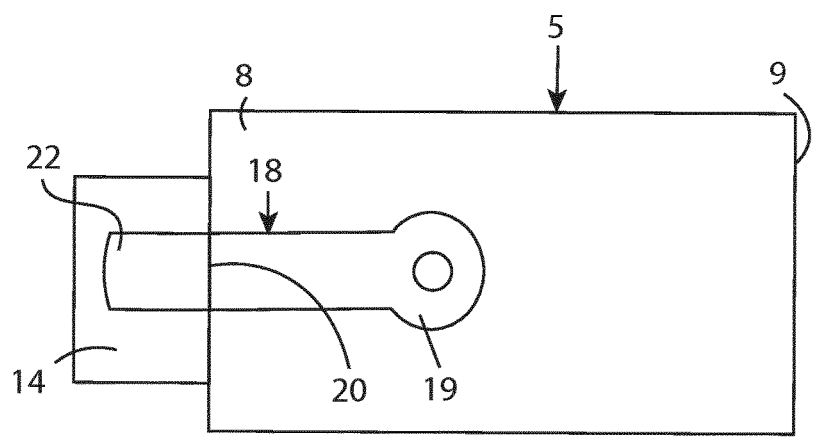
FIG. 7 illustrates the connection between a vertical spacer element and a horizontal spacer element.

FIG. 7 illustrates the connection between the vertical spacer element 14 and one of the horizontal spacer elements 5. The vertical spacer element 14 is, for example, the outer vertical spacer element 14a shown in FIG. 2. The second groove 22 of the vertical spacer element 14 is arranged in communication with the first grooves 18 of the horizontal spacer element 5 to allow the flexible temperature sensing element 16 to run between the first and second grooves. In a preferred embodiment, the horizontal spacer element 5 and the vertical spacer element 14 are in physical contact with each other.

Figure 8:
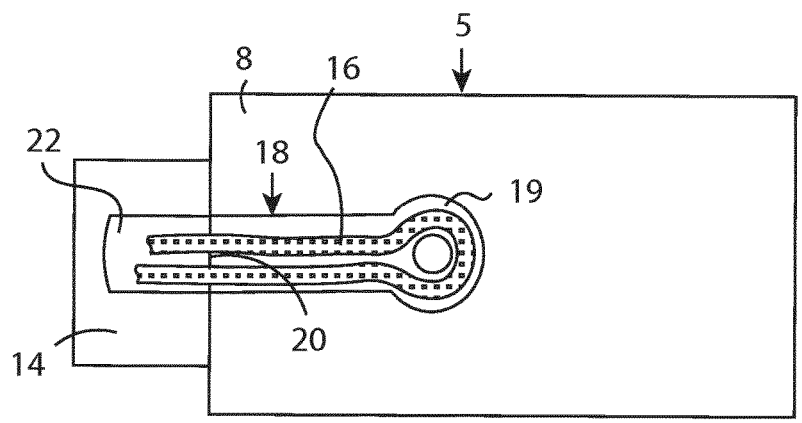
FIG. 8 shows a fibre optic cable disposed in a groove of the vertical spacer element and in a groove of the horizontal spacer element.

FIG. 8 shows a flexible temperature sensing element 16, in the form of a fibre optic cable, disposed in the second groove 22 of the vertical spacer element as well as in the first groove 18 of the horizontal spacer element 5. The flexible temperature sensing element 16 enters the first groove 18 from the second groove 22 through the entrance/exit part 20. The flexible temperature sensing element 16 is then wound one or more revolutions in the curved part 19 of the first grooves 18, and then leaves the first groove 18 through the entrance/exit part 20 and enters the second groove 22.

Figures 9, 10:
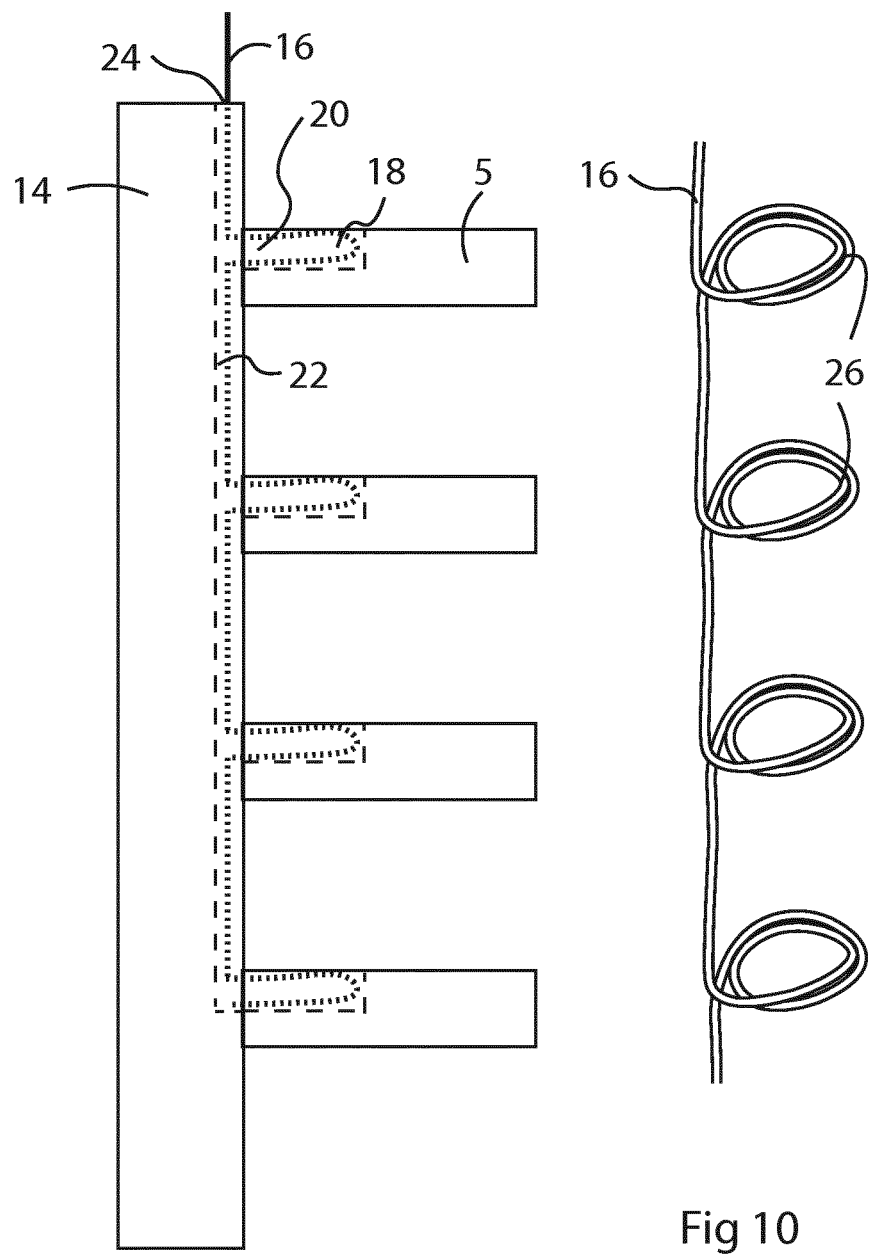
FIG. 9 shows an example of first and second spacer elements and an optical cable disposed in the first and second spacer elements.
FIG. 10 shows the optical fibre shown in FIG. 9 in a perspective view.

FIG. 9 shows an example of a vertical spacer element 14 and a plurality of horizontal spacer elements 5 arranged above each other. The horizontal spacer elements 5 are disposed at different vertical positions along the vertical spacer element 14. The second groove 22 of the vertical spacer element 14 is arranged in communication with the first grooves 18 of the horizontal spacer elements 5 to allow the flexible temperature sensing element 16 to run between the first and second grooves. The flexible temperature sensing element 16 enters the entrance 24 of the second groove 22, and then enters the entrance/exit part 20 of the first groove 18. The flexible temperature sensing element 16 is wound one or more revolutions in the curved part 19 of each of the first grooves 18 of the horizontal spacer elements. The flexible temperature sensing element 16 runs in the second groove 22 between the horizontal spacer elements 5. Thus, the flexible temperature sensing element 16 is disposed in the second groove 22 of the vertical spacer element as well as the first grooves 18 of the horizontal spacer elements 5.

FIG. 10 shows the flexible temperature sensing element 16 illustrated in FIG. 8 in a perspective view. As seen from the figure, the flexible temperature sensing element 16 forms a plurality of rolls 26 including a plurality of revolutions of the temperature sensing element. The rolls 16 are disposed in the first grooves 18 of the horizontal spacer elements 5. This embodiment is suitable for measurement with a Raman sensor.

The present invention is not limited to the embodiments disclosed but may be varied and modified within the scope of the following claims. For example, in one embodiment of the invention the vertical spacer elements can be solid, and the temperature sensing element runs between the horizontal spacers on the outside of the vertical spacers.

The invention claimed is:

1. A static electric induction apparatus comprising:
a winding including a plurality of winding units, a plurality of first spacer elements arranged above each other, wherein each of the first spacer elements has a first groove defined in the surface thereof,
a sensor system for monitoring the temperature in the apparatus, wherein the sensor system includes an elongated and flexible temperature sensing element disposed in each of the first grooves, the first grooves having a curved part that receive the flexible temperature sensing element which is wound at least one revolution in each of the first grooves, and the first spacer elements extend radially between the winding units and have outer ends facing outwardly from the winding, and the first grooves enter and exit the first spacer elements at the outer end thereof, wherein the static electric induction apparatus includes an elongated second spacer element extending in an axial direction on the outside of the winding, the second spacer element includes an elongated second grooved arranged in communication with the first grooves to allow the flexible temperature sensing element to run between the second groove and the first grooves, and the flexible temperature sensing element is disposed the first grooves of the first spacer elements and in the second groove of the second spacer element.

2. The static electric induction apparatus according to claim 1, wherein the flexible temperature sensing element is wound a plurality of revolutions in the first groove.

3. The static electric induction apparatus according to claim 1, wherein the flexible temperature sensing element is wound at least three revolutions in the first groove.

4. The static electric induction apparatus according to claim 2, wherein the length of the part of the flexible temperature sensing element, which is wound in the first groove is at least 0.15 m, preferably at least 0.4 m, and most preferably at least 1 m.

5. The static electric induction apparatus according to claim 1, wherein the first groove includes a circular part.

6. The static electric induction apparatus according to claim 1, wherein the sensor system includes an optic sensor adapted for distributed temperature measuring.

7. The static electric induction apparatus according to claim 6, wherein the optic sensor is a Raman sensor.

8. The static electric induction apparatus according to claim 1, wherein the flexible temperature sensing element is a fiber optic cable.

9. The static electric induction apparatus according to claim 1, wherein the sensor system further comprises: an optic sensor configured to generate a laser pulse passing through the fiber optic cable and to detect when the laser pulse is returned, and an evaluating unit configured to determine the temperature in the winding based on light scattering of the laser pulse and the time difference between the points in time when the laser pulse was generated and when it was returned.

10. The static electric induction apparatus according to claim 1, wherein the static electric induction apparatus is a transformer.

11. The static electric induction apparatus according to claim 1, wherein the winding is a disc winding or a helical winding.

12. The static electric induction apparatus according to claim 2, wherein the flexible temperature sensing element is wound at least three revolutions in the first groove.

13. The static electric induction apparatus according to claim 3, wherein the length of the part of the flexible temperature sensing element, which is wound in the first groove is at least 0.15 m, preferably at least 0.4 m, and most preferably at least 1 m.

14. The static electric induction apparatus according to claim 2, wherein the first groove includes a circular part.

15. The static electric induction apparatus according to claim 2, wherein the sensor system includes an optic sensor adapted for distributed temperature measuring.

16. The static electric induction apparatus according to claim 2, wherein the flexible temperature sensing element is a fiber optic cable.

17. The static electric induction apparatus according to claim 2, wherein the static electric induction apparatus is a transformer.

18. The static electric induction apparatus according to claim 2, wherein the winding is a disc winding or a helical winding.

19. The static electric induction apparatus according to claim 9, wherein the flexible temperature sensing element is a fiber optic cable.

* * * * *